(12) United States Patent
Cummings

(10) Patent No.: US 11,938,705 B1
(45) Date of Patent: *Mar. 26, 2024

(54) SEMI-CORRUGATED PAPERBOARD PANELS AND METHOD FOR PRODUCTION OF SAME

(71) Applicant: Semi Corr Containers, Inc., Phillips, WI (US)

(72) Inventor: James Alan Cummings, Phillips, WI (US)

(73) Assignee: Semi Corr Containers, Inc., Phillips, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,403

(22) Filed: Sep. 7, 2023

Related U.S. Application Data

(63) Continuation-in-part of application No. 18/123,675, filed on Mar. 20, 2023, now Pat. No. 11,794,439.

(51) Int. Cl.
*B32B 7/12* (2006.01)
*B32B 29/00* (2006.01)
*B32B 29/08* (2006.01)

(52) U.S. Cl.
CPC ............ *B32B 29/005* (2013.01); *B32B 7/12* (2013.01); *B32B 29/08* (2013.01); *B32B 2250/05* (2013.01); *B32B 2250/26* (2013.01)

(58) Field of Classification Search
CPC ....... B32B 29/00; B31F 1/2818; B31F 1/2804
See application file for complete search history.

(56) References Cited

U.S. PATENT DOCUMENTS 5,146,823 A * 9/1992 Holmes .................... B26D 7/01
83/485

* cited by examiner

*Primary Examiner* — Lawrence D Ferguson
(74) *Attorney, Agent, or Firm* — Boyle Fredrickson S.C.

(57) ABSTRACT

A means of making a multi ply structural panel by eliminating the top liner in the corrugating process. The present invention is made possible through modification to the corrugating rolls of the singlefacer. The design modification to the rolls involves incorporation of slots that run around the circumference of one roll and mating creasing tools incorporated around the circumference of the other of the corrugated roll set. These slots and creasing tools are incorporated across the existing flutes of the corrugating rolls.

2 Claims, 9 Drawing Sheets

SEMI-CORRUGATED PAPERBOARD PANELS AND METHOD FOR PRODUCTION OF SAME

CROSS-REFERENCE TO RELATED APPLICATIONS

This application is a continuation-in-part of U.S. patent application Ser. No. 18/123,675, filed Mar. 20, 2023, which is incorporated by reference herein in its entirety.

FIELD OF THE INVENTION

The present invention pertains to products comprising paperboard panels and a method for their manufacture. More specifically, the panels are produced on a standard corrugator by suitable modification of the corrugated rolls associated with a singlefacer.

The panels are envisioned to replace conventional corrugated packaging for a variety of packaging applications thereby minimizing waste while still ensuring damage free delivery of goods.

BACKGROUND OF THE INVENTION

Corrugated board is used in a ubiquitous fashion for packaging of a wide variety of manufactured and agricultural products. Strength of a corrugated package is defined by Top-to-Bottom Compression (TBC). TBC is closely correlated to the Edge Crush Test (ECT) of the corrugated board that the box is manufactured from. ECT is further strongly correlated with the basis weight of the liners and corrugated medium from which the board is manufactured.

There has been continued growth in the use of corrugated containers with the advent of e-commerce small orders individually packaged for shipment directly to consumer dwellings versus bulk packaging of goods to warehouse distribution centers and big box stores. This has put a downward pressure on the basis weight of liners and mediums used to make the corrugated board. From an economic and environmental point of view this is a positive development in that use of lower basis weight papers means use of less wood fiber. The economic problem is that 80% to 85% of the cost of corrugated packaging is related to its fiber content. Ecologically, use of less fiber reduces the harvest of trees leaving them to absorb $CO_2$ and, in this way, is a solution to the global warming problem.

There are limits to the downsizing of basis weights of liner and medium in the corrugating manufacturing process. Very lightweight liners and mediums are less likely to withstand the rigors of the high speed manufacturing process.

Consequently, there is a need in the corrugated industry for an approach other than continued reduction of paper basis weights for matching the design of corrugated boxes to their packaging requirements.

Corrugated board comes in a variety of types mainly dictated by flute formation and fiber content. Eighty five percent of the domestic US corrugated market is served by two flute types, mainly C flute with 41 flutes per lineal foot of board and B flute with 49 flutes per lineal foot of board. In the B flute and C flute board categories, a large majority of the market is covered mainly by C and B flute singlewall and BC flute doublewall.

Singlewall board is comprised of a top liner and a bottom liner that are spaced apart by the fluted medium that is suitably attached to the liners by a starch based adhesive to provide a 3 ply panel.

BC doublewall board is comprised of a top liner adhered to fluted C medium with the inside of the fluted C medium attached to another top liner that is adhered to a fluted B medium and the inside of the fluted B medium then attached to a bottom liner to achieve a 5 ply panel. The B flute and C flute 3 ply singlewall or 5 ply doublewall board products are available to fit the market need using a wide variety of medium and liner paper basis weights.

In the corrugated board manufacturing process, the top liner is attached to a fluted medium in a machine called the singlefacer. The most critical components of the singlefacer are a pair of corrugating rolls. The corrugating rolls are manufactured with flutes ground into the surface of the roll running longitudinally across the face of the rolls. There are two rolls, an upper roll and a lower roll, that mesh together in such a way that when a medium paper is run between them, flutes are formed in the medium. It is these flutes that ultimately space apart the top and bottom liners to form corrugated board.

Upstream of the corrugating rolls there normally exists a medium conditioning system involving heat and steam that soften the medium to allow flutes to form between the corrugated rolls without fracturing of the medium paper. As the fluted medium emerges from the labyrinth between the corrugating rolls, a glue system, comprised of a starch pan, glue roll and metering roll, applies starch to the flute tips. The fluted medium then merges with the top liner at entrance to the pressure roll of the singlefacer where a green bond is formed between the flute tips of the medium and the top liner by high pressure. The web emerging from the pressure roll is called the singleface web.

The singleface web is conveyed up onto a bridge belt conveyor system by an inclined top and bottom belt system. The bridge belt conveyor runs at slower speed than the singlefacer causing the singleface web to form a folded accumulation called the bridge buffer. The bridge buffer allows a speed variation between the dry end of the corrugator and the wet end for things such as slow down of the wet end for splicing of new papers.

The accumulated singleface web is conveyed downstream to a bridge guide where it is pulled out of accumulation onto a preheater drum and then into a standalone glue machine that runs at corrugator speed. The glue machine applies starch to the exposed flute tips on the inside of the singleface web which then merges with the bottom liner at the entrance to a machine called the doublefacer. The function of the doublefacer is to cure the bond between the singleface web and the bottom liner using a low pressure weighted hold down belt that conveys the now corrugated web over a series of steam heated hot plates with the aid of a downstream pulling section.

The bonded corrugated board emerges from the doublefacer and enters the dry end of the corrugator where it is slit into desired widths and cut into lengths as required by the order being run on the corrugator. The corrugated panels are then stacked in a downstacker with loads discharged for further processing as boxes or other applications.

SUMMARY OF THE INVENTION

The current invention provides an increase in the number of available products and can better address packaging requirements. The basic precept of the current invention involves modification to the process of flute formation that provides more choice in the number of paper plies used in construction of the corrugated board such as a 2 ply panel or a 4 ply panel, for example. Alternatively, these same precepts can make a 3 or 5 ply panel configuration that is stronger than the conventional 3 ply or 5 ply board for equal fiber weight.

A 2 ply panel that uses equal basis weight papers instead of a 3 ply panel can reduce fiber content by roughly thirty percent. A 4 ply panel of the current invention can provide performance equal to that of a 5 ply doublewall panel with a twenty percent fiber savings. This level of fiber savings is huge as even a small fraction of basis weight reduction in corrugated board is considered significant. With a worldwide market for corrugated boxes and other corrugated applications of more than $100 billion per year, and with fiber representing 85 percent of the cost of production of corrugated, there is great incentive for the introduction of a new product that could provide on average twenty to thirty percent fiber savings.

The present invention involves, in part, a means of making a two ply structural panel by eliminating the top liner in the corrugating process. This product is called "SemiCorr" board and referred to as "semi corrugated board" because it includes only a portion of the conventional corrugated panel. Semi corrugated board is made possible by significant modification to the corrugating rolls of the singlefacer. The design modification to the rolls involves incorporation of slots that run around the circumference of one roll and mating creasing tools incorporated around the circumference of the other of the corrugated roll set. These slots and creasing tools are incorporated across the existing flutes of the corrugating rolls. With semi corrugated board corrugating rolls, a medium paper run between the meshed rolls is fluted in the cross machine direction but also creased across the flute tips in the in-line machine direction. The creases are closely spaced across the face of the rolls with resulting medium out of the semi corrugated board corrugating rolls having a matrix pattern look. With semi corrugated board corrugating rolls, the fluted and creased medium can be run directly up onto the bridge without the normal bonding of a top liner. The glue roll of the singlefacer is backed away from contact with the medium fluted and creased by the corrugating rolls and the top liner is absent from the corrugating process.

Without the top liner bonded to a conventional fluted medium beneath the pressure roll of the singlefacer, the resulting product would straighten out under tension with flutes simply disappearing. But the creases across the flutes created by the semi corrugated board corrugating rolls prevent this fluff out phenomena with the fluted and creased medium maintaining integrity of its formation as it is accumulated on the bridge and conveyed to the downstream glue machine and doublefacer. This fluted and creased medium, according to the precepts of the current invention is called the creased base layer. This creased base layer behaves on the bridge similar to the singleface web of conventional corrugated with the buffer of folded creased base layer conveyed downstream where it is pulled from the buffer, threaded around a preheater drum and run into the glue machine. The glue machine applies starch adhesive to the tips of the flutes as well as the creases that act as cross flute bond lines with the creased base layer then merged with the bottom liner at the entrance to the doublefacer. The flutes and cross flute bond lines form a matrix pattern of attachments to the bottom liner when cured in the doublefacer providing the stable new two ply corrugated product called semi corrugated board. Semi corrugated board can be produced directly on the corrugator using any flute type.

Another product made possible by use of semi corrugated board corrugating rolls is a doublewall version wherein the rolls are independently incorporated in two singlefacers on the corrugator, one with C flute semi corrugated board rolls and the other with B flute semi corrugated board rolls. The fluted and creased mediums from the C flute singlefacer and the B flute singlefacer are run through independent levels of the glue machine and then merged in the doublefacer along with the bottom liner. The matrix type pattern of the C flute creased base layer is bonded directly to the exposed flute tips of the B flute and the matrix pattern of the B flute creased base layer is bonded to the bottom liner to create a 3 ply panel that is a new product called BC semi corrugated board doublewall according to the present invention. BC semi corrugated board doublewall board made from three plies of paper has less fiber content than conventional C flute singlewall board yet has greater cushioning protection for products packaged as does most doublewall board.

Yet another product made possible with use of semi corrugated board corrugating rolls involves adding back the top liner to the fluted and creased medium to produce a modified singleface web that has the flute/crease matrix type pattern on the inside of the web. This singleface web is conveyed downstream and ultimately bonded to the bottom liner.

This product called "MCorr" or referred to as "matrix corrugated board" is a 3 ply panel that looks exactly like a conventional singlewall corrugated board. Matrix corrugated board is stronger because the matrix style glue lines improve the in-line flexural stiffness of the resulting singlewall corrugated board without substantially compromising the cross corrugator flexural stiffness. Since the box compression strength is proportional to the flexural stiffness index (which is the square root of the product of in-line and cross corrugator flexural stiffness) the resulting board will be stronger with less fiber.

The center liner in a conventional 5 ply doublewall box adds comparatively less strength to the board structure. Another product made possible by semi corrugated board corrugating rolls is a 4 ply doublewall corrugated board with no center liner. A matrix corrugated board singleface web is made on an upstream singlefacer on the corrugator and a B flute semi corrugated board fluted and creased web minus the top liner is made on a downstream singlefacer. The matrix corrugated board singleface web and the semi corrugated board creased base layer are run through independent levels of the glue machine and then merged together with the bottom liner. The matrix corrugated board matrix style fluted and creased singleface web is bonded directly to the flutes of the semi corrugated board web and the semi corrugated board matrix style fluted and creased web is bonded to the bottom liner to make a 4 ply panel that looks exactly like a conventional 5 ply doublewall panel except that it is a missing the center liner.

There are many markets in the world where eighty percent of boxes are made of doublewall board. The merging of matrix corrugated board singleface with a semi corrugated board creased base layer and a bottom liner forms a board that could make boxes indistinguishable from those made with the commonly run doublewall product with twenty percent less fiber.

A triplewall version of semi corrugated board eliminates the internal liners of conventional triplewall board resulting in substantial fiber reduction in this type of packaging. The typical triplewall corrugated board is comprised of seven plies including three sets of fluted medium, a top liner, a bottom liner and two internal liners. Semi corrugated triplewall is a five ply product manufactured using independent semi corrugated board corrugating rolls in each of three singlefacers in a corrugator. For example, the most upstream singlefacer in the corrugator creates an E flute creased base layer that is bonded to a top liner, the next downstream singlefacer creates a C flute creased base layer and the most downstream singlefacer creates another E flute creased base layer. The singleface web of E flute creased base layer with top liner and the creased base layers from the C flute singlefacer and second E flute singlefacer are run through independent levels of a triple stack glue machine and then merged with the bottom liner at entrance to the doublefacer. The matrix pattern of the E flute creased base layer with associated top liner is bonded directly to the back side of the C flute creased base layer and the fluted and creased C flute is bonded directly to the back side of the second E flute creased base layer which is then bonded to the bottom liner. ECE triplewall semi corrugated board made in this fashion has five plies thereby reducing the fiber content over the conventional seven ply triplewall board by more than twenty five percent. The five play semi corrugated triplewall panel could also be produced using a conventional singleface web on the top bonded to two creased base layers. For example, a conventional E flute singleface web bonded to the back side of a C flute creased base layer which is bonded to the back side of another E flute creased base layer to create a ECE triplewall product.

Mixing and matching semi corrugated board, matrix corrugated board and conventional corrugated provides a significant new dimension to the repertoire of products available to match a corrugated solution to packaging requirements other then simply altering paper basis weights. A partial table of potential products using the precepts of the current invention is as follows:

| PRODUCT | PLIES |
|---|---|
| B semi corrugated board | 2 |
| C semi corrugated board | 2 |
| B matrix corrugated board | 3 |
| C matrix corrugated board | 3 |
| BC semi corrugated board doublewall | 3 |
| C matrix corrugated board & B semi corrugated board doublewall | 4 |
| C matrix corrugated board & B matrix corrugated board doublewall | 5 |
| ECE matrix corrugated board triplewall | 5 |

These products could be run in addition to the normal products run on a conventional corrugator that are limited as follows:

| PRODUCT | PLIES |
|---|---|
| B singlewall | 3 |
| C singlewall | 3 |
| BC doublewall | 5 |
| ECE triplewall | 7 |

The B and C semi corrugated board 2 ply panels are weaker than the conventional B and C singlewall 3 ply panels but are nonetheless adequate for a significant portion of the packaging market with thirty percent less fiber content.

The B and C matrix corrugated board 3 ply panels are stronger than conventional B and C singlewall 3 ply panels for equal fiber weight and could therefore meet many market needs with less fiber at a significant cost advantage.

The 3 ply BC semi corrugated board doublewall package will provide many advantages similar to those of a 5 ply doublewall package in terms of cushioning and strength with less fiber content than B and C singlewall 3 ply panels and will therefore meet many market niches where the singlewall could not compete.

The 4 ply C matrix corrugated board & B semi corrugated board panel is significant because the center liner of conventional doublewall corrugated board that adds comparatively less strength is eliminated allowing a twenty percent fiber reduction. The matrix corrugated board feature with the matrix bond pattern also adds strength to the box. A C matrix corrugated board and B matrix corrugated board 5 ply doublewall panel will be stronger than the conventional CB doublewall because of the matrix style bond pattern allowing fiber reduction.

The five ply triplewall semi corrugated board panel will look exactly like conventional triplewall corrugated board yet have substantially reduced fiber content. The internal liners of conventional triplewall corrugated board add relatively little to the strength of the box. The basis weight of the outer liners of the semi corrugated triplewall box can be upgraded to provide a superior panel while still reducing overall fiber content.

To produce semi corrugated board and matrix corrugated board, the cross machine direction flutes in the corrugating process must be creased in the machine direction. The creases allow fluted medium paper to be pulled up onto the bridge of the corrugator without the presence of a top liner. The creases along with the flutes form a matrix of glue lines required to achieve an outstanding bond. Singlefacers all have some form of heating and softening of the fibers by conditioning with steam to facilitate medium flute formation without fracturing. The function of the creasing is to crush the flutes in-line to form cross flute bond lines. To minimize flute fracturing during the creasing process it would be best to have creasing done close to the point of flute formation.

Most singlefacers have a means of quick flute change. A typical way of achieving this is to design the singlefacer with cassettes containing just the corrugating roll set with means of quickly changing the cassette in or out of the singlefacer. To run semi corrugated board, it is envisioned by the current invention that the corrugating rolls required to run semi corrugated board would be installed in their own cassette. There are other means of quick change of a corrugated roll set with some singlefacers having multiple roll sets mounted within the machine that can swing in or out of engagement with the other components of the singlefacer. These concepts for roll change are envisioned to fit within the framework of the current invention.

Semi corrugated board can be made on any type of singlefacer. A primary difference between singlefacers is whether the pressure roll (or pressure belt) is mounted on the top of the corrugated roll set or the bottom. The following discussion will be based upon the assumption of a singlefacer with a bottom mounted pressure roll. For the method to apply to top mounted pressure roll singlefacers, all that would be required is to reverse the description of design of the top corrugated roll to the bottom corrugated roll as would be understood by one having ordinary skill in the art.

Semi corrugated board and matrix corrugated board and variations of these products are made with a preferred embodiment that uses a set of corrugating rolls with closely spaced slots milled into the lower corrugated roll and mating creasing tools incorporated directly into the upper corrugated roll to make the in-line cross flute creases.

It is a huge advantage in running semi corrugated board if the total set-up is a simple change of the singlefacer cassette as is done for normal flute change. Corrugator crews are very familiar with and competent at change of singlefacer cassettes. Also, introduction of new corrugated concepts such as semi corrugated board and matrix corrugated board is much easier if the only outlay for the user is simply purchase of a pair of modified corrugating rolls mounted in a new cassette. Therefore, in a preferred embodiment of the current invention the semi corrugated board roll set is mounted in a dedicated singlefacer cassette.

Depending upon the singlefacer design, it may be possible to modify the machine to incorporate an independent creasing roll in the singlefacer cassette. This creasing roll would be located immediately downstream of the point of flute formation in the singlefacer. Singlefacers are compact and not much space is available to add an entirely new roll. Therefore, use of a standalone creasing roll may be problematic for a large variety of singlefacers. The advantage to using a standalone creasing roll is that the upper corrugated roll in the semi corrugated board roll set could be a standard longitudinally fluted roll. As the marketing for these new corrugated products proceeds, it will be desirable and advantageous for singlefacer manufacturers to market their machines as semi corrugated board ready by making modifications to their designs to incorporate creasing rolls in their cassettes.

With semi corrugated board corrugating rolls in an existing cassette, no other changes need be made to the corrugator to run semi corrugated board or matrix corrugated board. Glue rolls have settings that allow them to be backed away. Pressure rolls have settings that allow them to be run at variable pressures. Most corrugated rolls have a crown in one or the other of the rolls to accommodate deflections associated with normal pressure settings of the pressure roll. With lower pressure settings it may be necessary to factor this into the design of the semi corrugated board corrugating rolls.

US Patent Application Publication 2020/0156348 A1, published May 21, 2020, and hereby incorporated by reference, discloses a two ply paperboard concept. Panel spacers are formed between a first and second linerboard by penetrating flaps through one of the liners that are formed and adhered to the other of the liners in a suitable process. This two ply panel has poor flat crush test results due to strength of the flap structures under a compressive load. The flaps will fold easily in this situation with poor resulting flat crush. Flat crush is important as it affects the printability of the two ply paperboard produced as well as resistance to compression in the die cutting process.

The flat crush of the 2 ply semi corrugated board panel of the present invention is superior because the panel has full support of the fluting (as does conventional corrugated board) and support of the cross flute bonding lines as well. Semi corrugated board will also have substantially greater edge crush test and greater top-to-bottom compression because it retains the fluting that provides the essential ingredient for greater strength.

Another two ply panel concept is disclosed in U.S. Pat. No. 6,939,599 B2, published Sep. 6, 2005, and hereby incorporated by reference. The flat crush of board made as shown in FIG. 1 A-D of this patent is not as good as semi corrugated board of the present invention due to spacing constraints of the dimples in the dimple board. Although the patent refers to creation of a dimple panel using paperboard, there is a major issue relating to take-up factor in forming the dimples. The dimple board will require take-up in the cross machine direction as well as the in-line machine direction that is likely to fracture the paper in the forming process. This issue will prevent close spacing of the dimples in the paperboard and will therefore affect flat crush in a negative fashion. This will be a problem when running lightweight papers to minimize basis weight.

Another disclosure pertinent to the current invention is an article titled "NXTCorr, The Most Significant Development Within the Corrugated Industry in the Last One Hundred Years" by Corrugated Synergies International, found at <https://www.csicorr.com/blank>, and hereby incorporated by reference. This article discloses the concept of in-line corrugating wherein flutes on the corrugating rolls are ground around the circumference instead of longitudinally across the face of the rolls. The alleged advantage of this in-line corrugating process is that the flutes are co-linear with nominal fiber orientation in the liner papers so that the resulting board has superior edge crush.

The semi corrugated board idea of the current invention is dissimilar from the NXTCorr in-line fluting concept in that it retains conventional cross corrugator fluting that, in conjunction with in-line creasing, creates a matrix of flutes and creases. Unlike NXTCorr, the primary goal of the semi corrugated board idea is to introduce new corrugated products to provide packaging alternatives with increased strength a secondary objective.

Semi corrugated board and matrix corrugated board and associated derivative products can be run on any corrugator singlefacer to match the specifications of the packaging task. Lighter combined board basis weights are achieved by elimination of entire plies of paper with the concepts of the current invention.

BRIEF DESCRIPTION OF THE DRAWINGS

The foregoing and other aspects of the present invention will become apparent to those skilled in the art to which the present invention relates upon reading the following description with reference to the drawings below.

DETAILED DESCRIPTION OF THE DRAWINGS

While the current invention is susceptible to embodiments in many different forms, there is shown in drawings and described in detail herein specific embodiments with understanding that the present disclosure is to be considered as an exemplification of the principles of the invention and is not intended to limit the invention to the embodiments illustrated.

Figure 1:
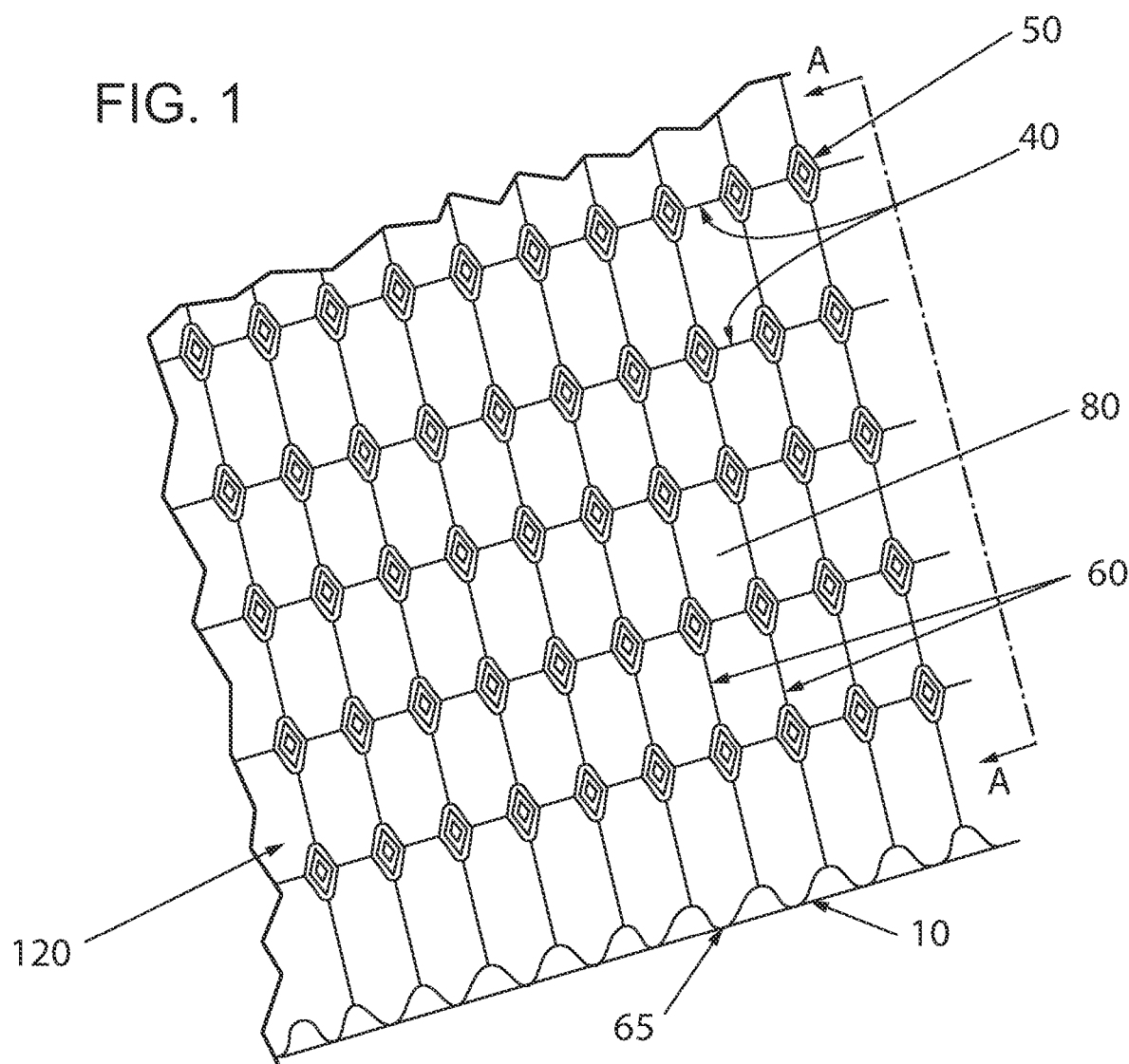
FIG. 1 is a perspective view of the inside of the two ply semi corrugated board.

FIG. 1 is a perspective view of the inside of a semi corrugated board 120. The semi corrugated board 120 is comprised of bottom liner 10 adhered to a creased base layer 80. The creased base layer 80 is defined by a conventional fluted medium ply 60 that has cross flute bond lines 40. The cross flute bond lines 40 are spaced at regular close intervals across the flutes 60 and are bonded along with the bottom tips of the flutes 65 to the inside of bottom liner 10 to form the semi corrugated board 120. The cross flute bond lines 40 are crushed into the flutes 60 by a creasing process that will be shown in successive figures.

The cross flute bond lines 40 serve two functions. First, they stabilize the fluting 60 to facilitate transport of the creased base layer 80 to a glue machine where starch adhesive is applied to the flute tips 65 and the cross flute bond lines 40. Second, when the glued fluted base layer 80 is adhered to the bottom liner 10, it forms a matrix of glue lines in conjunction with the flute tips 65 to form the structural semi corrugated board panel 120.

Figure 2:
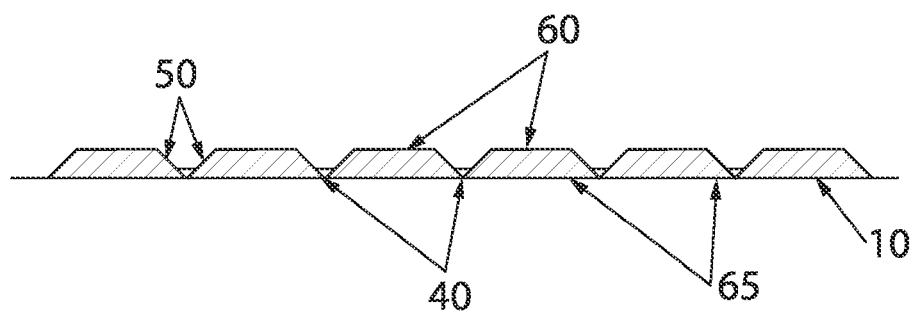
FIG. 2 is a section view of the semi corrugated board.

The creases 50 are clearly shown in FIG. 2 which is a section view A-A of the semi corrugated board of FIG. 1. The cross flute bond lines 40 and the tips of the flutes 65 are bonded to the bottom liner 10 as starch adhesive applied in the downstream glue machine of the corrugator is cured.

Figure 3:
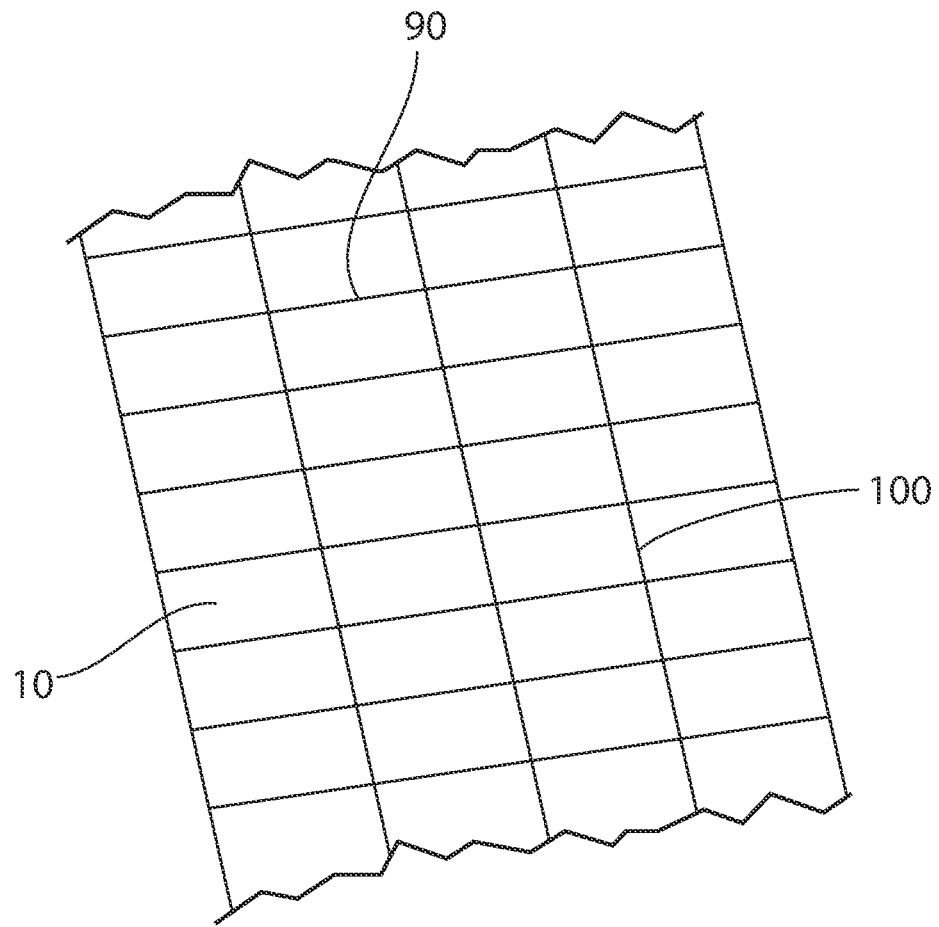
FIG. 3 depicts the inside of the bottom liner soaked apart from semi corrugated board with a matrix of glue lines shown.

FIG. 3 shows the inside of the bottom liner 10 after it has been soaked apart from the semi corrugated board 120 and sprayed with iodine mist to highlight the glue lines formed. Glue lines associated with the flute tips 65 and the tips of the cross flute bond lines 40 are shown. The net effect of the creasing of the flutes 60 to create the cross flute bond lines 40 is to achieve a stable two ply panel with a matrix of glue lines in the cross machine direction 90 and the in-line machine direction 100.

Figure 4:
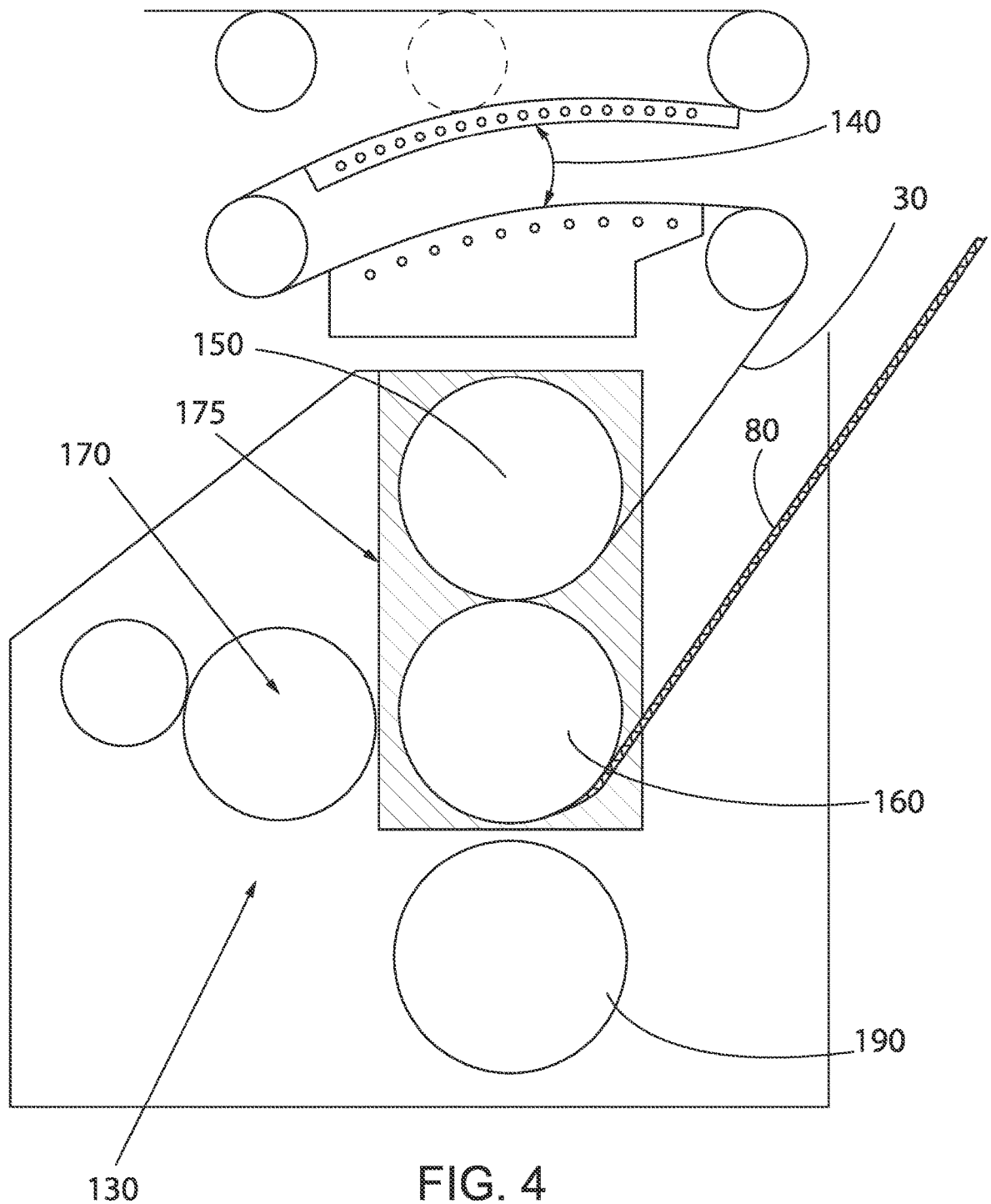
FIG. 4 is a schematic side view of a singlefacer with bottom mounted pressure roll.

A schematic side view layout drawing of a singlefacer 130 is shown in FIG. 4. A primary function of singlefacer 130 is to flute corrugated medium web 30 between upper corrugated roll 150 and lower corrugated roll 160 mounted in singlefacer cassette 175.

It is well known in the art that although the singlefacer is shown with a bottom mounted pressure roll 190, some singlefacers have top mounted pressure rolls. The current invention will proceed with describing how the creased base layer 80 will be manufactured with the bottom mounted pressure roll configuration singlefacer. The difference between the current invention from a singlefacer with a top mounted pressure roll is that the functions of the corrugated rolls 150 and 160 will be reversed in the formation of the creased base layer 80.

Medium ply 30 is heated and steamed by conditioning system 140 as shown in FIG. 4 to make the paper malleable without fracturing in the fluting process. Fluting occurs as the medium ply enters the labyrinth between upper corrugating roll 150 and lower corrugating roll 160.

In a preferred embodiment of the current invention, creases 50 are put into the flutes 60 simultaneously with the flutes being formed by the corrugating rolls. In this embodiment of the current invention, slots are milled into the lower corrugating roll 160 that mate with creasing tools that have been formed in the upper corrugating roll 150 as will be shown in FIGS. 5 and 7. The creasing tools of corrugating roll 150 form the cross flute bonding lines 40 as they are recessed into slots of corrugating roll 160. Pressure roll 190 runs against lower corrugating roll 160 at pressure consistent with corrugating roll crowns acting mainly to pull the creased base layer 80 out of the singlefacer. Glue roll 170 has been backed away from contact with lower corrugating roll 160 with no starch applied to creased base layer 80. The top liner that normally is introduced between the pressure roll 170 and lower corrugating roll 160 is eliminated according to the present invention.

Figure 5:
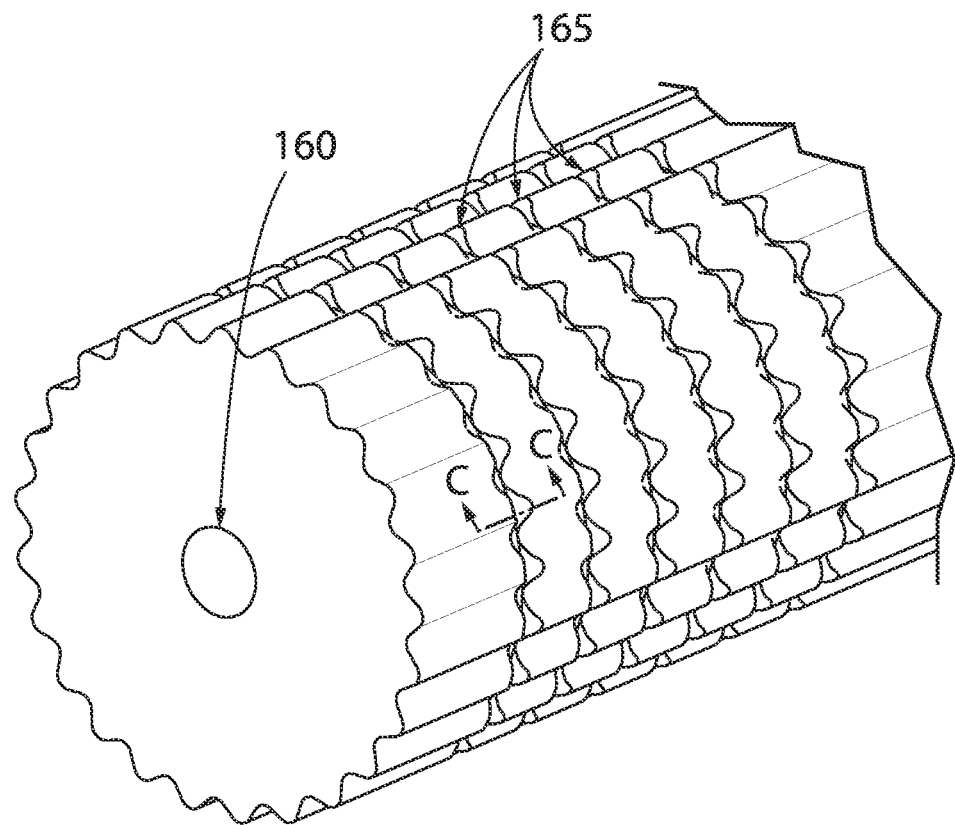
FIG. 5 is a perspective view of the slotted lower semi corrugated board corrugated roll of the singlefacer showing nominal slot spacing.

FIG. 5 is a perspective view of the slotted lower corrugating roll 160 showing nominal slot spacing. Slots 165 are milled into this roll to facilitate forming of the cross flute bond lines 40. Spacing between slots is a function of the flute type being run with half inch spacing for C flute corrugated normal, although greater or lesser spacing falls within the scope of the present invention.

Figure 6:
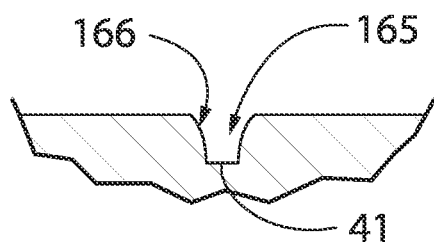
FIG. 6 is a section view of a slot in the lower corrugated roll.

FIG. 6 shows a section view C-C of FIG. 5 of a preferred embodiment of a slot 165 in slotted corrugating roll 160. Shoulder radius 166 of the slots is designed to minimize the stress put into the medium paper 30 as flutes are creased. The bottom of the slots 41 are flat to create the cross flute bond lines 40. There are a number of specific slot designs that would fulfill the objective of creating the cross flute bond lines with these variations falling within the scope of the present disclosure.

Figure 7:
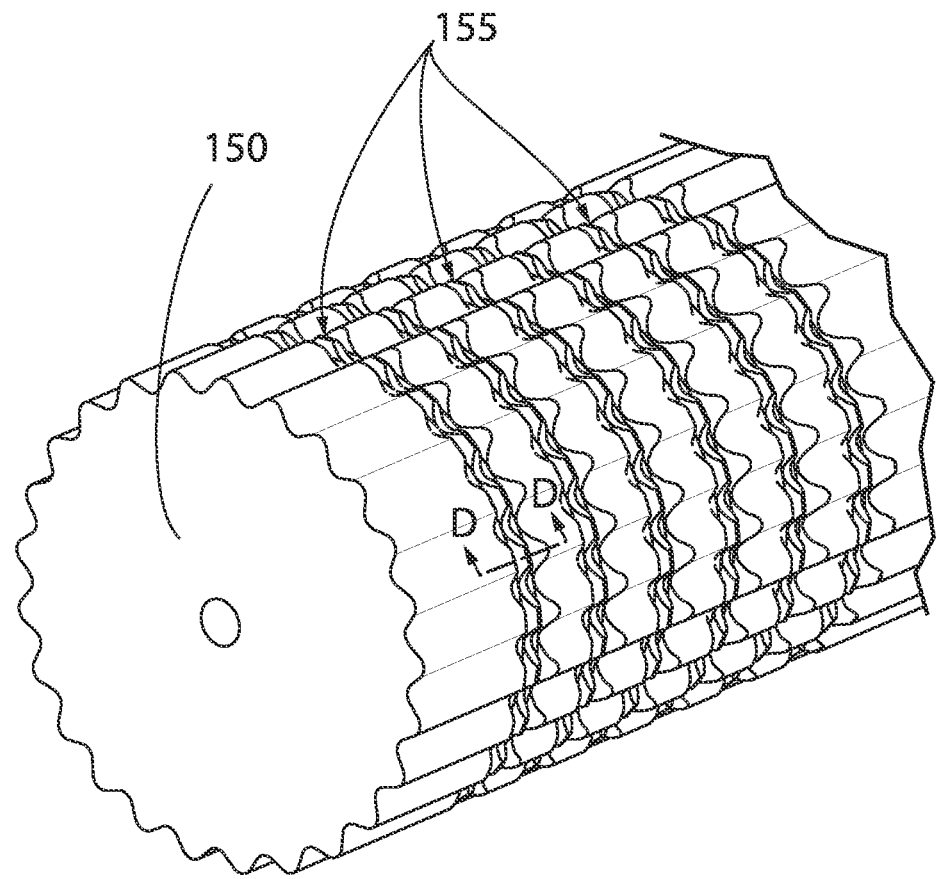
FIG. 7 is a perspective view of the upper semi corrugated board corrugated roll with creasing tools machined in the roll.
Figure 8:
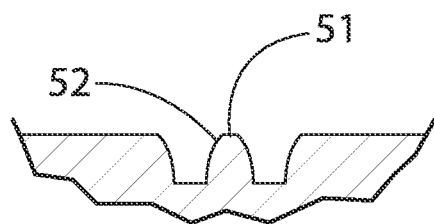
FIG. 8 is a section view showing the profile of the creasing tool machined into the upper semi corrugated board corrugated roll.

FIG. 7 shows a perspective view of upper corrugating roll 150 with creasing tools 155 positioned across the width of the roll to mesh with the slots 165 of the lower corrugating roll in a preferred embodiment. FIG. 8 is a section view D-D of FIG. 7 of a creasing tool embedded in the upper corrugating roll 150. The top of the creasing tool 51 is flat to create the cross flute bond line. Flanks 52 of the creasing tool are designed to minimize stress in the corrugated medium as the creases are formed. There are many specific creasing tool designs that would create the cross flute bond lines with all such designs falling within the scope of the current disclosure.

Figure 9:
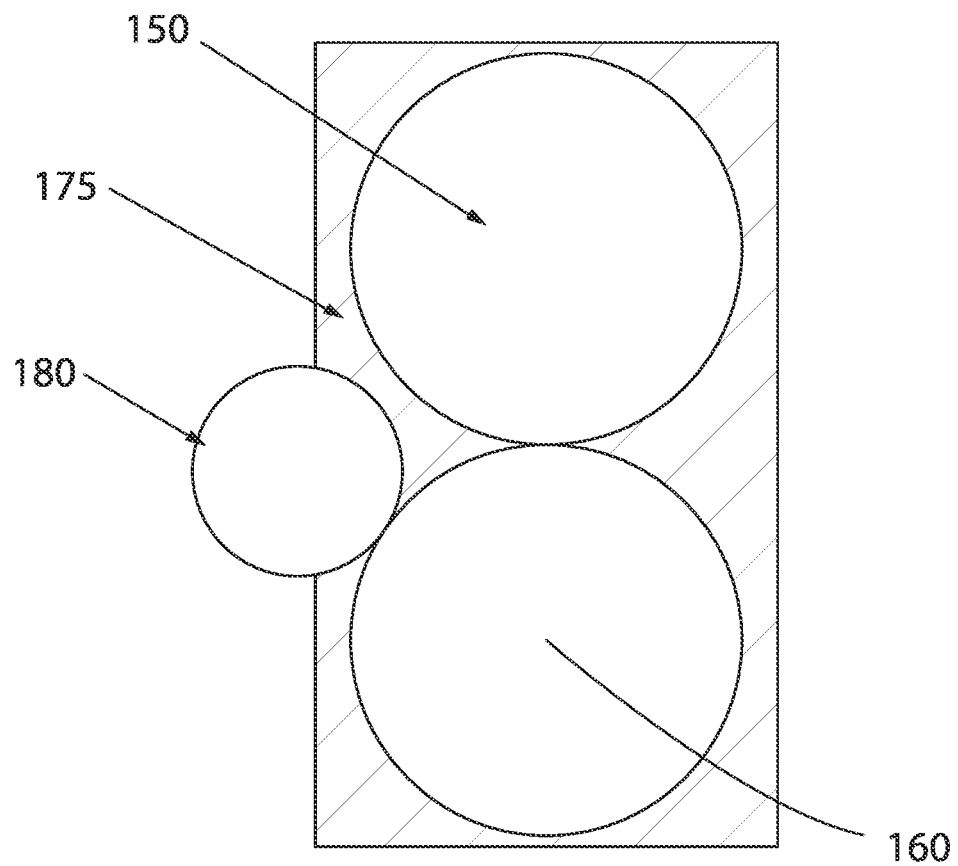
FIG. 9 shows an independent creasing roll embedded within the singlefacer cassette that is shown in cross hatch in FIG. 4.

Another approach to creasing the fluted medium would be to add an independent creasing roll in the singlefacer cassette as shown in FIG. 9. The creasing roll 180 is shown incorporated in the singlefacer cassette 175. To incorporate the stand alone creasing roll, clearance must be provided for glue roll 170 with either suitable adjustment or design modification as required. The standalone creasing roll could be powered within the singlefacer cassette. It would also allow use of a conventional upper corrugated roll 150 and a slotted lower corrugated roll 160. If space allows use of a standalone creasing roll, this embodiment would also allow production of semi corrugated board with simple replacement of the cassette 175.

Figure 10:
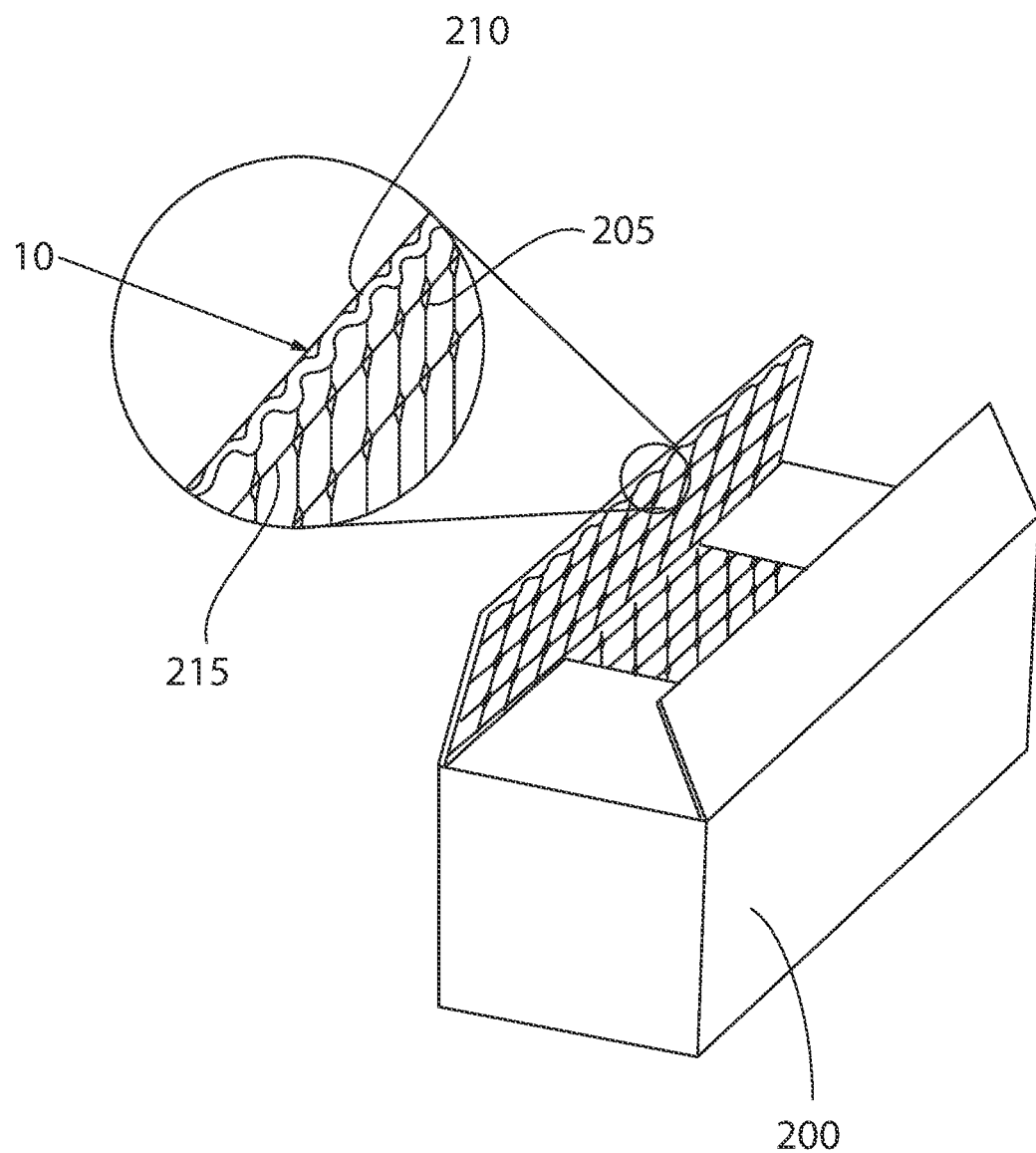
FIG. 10 is a perspective view of a typical box made from BC semi corrugated board doublewall board.

A box 200 made from BC semi corrugated board doublewall board 215 is shown in FIG. 10. To create the semi corrugated board doublewall used to make box 200, B flute creased base layer 210 is made on the singlefacer closest to the glue machine and C flute creased base layer 205 is made upstream on the corrugator. Glue is applied to both creased base layers on independent levels of the glue machine and the B and C creased base layers are then merged at entry to the doublefacer to create the BC semi corrugated board doublewall 215. The B creased base layer 210 is bonded to the bottom liner 10 and the C flute creased base layer 205 is bonded directly to the B flute base layer 210 to make the BC semi corrugated board doublewall board 215.

Figure 11:
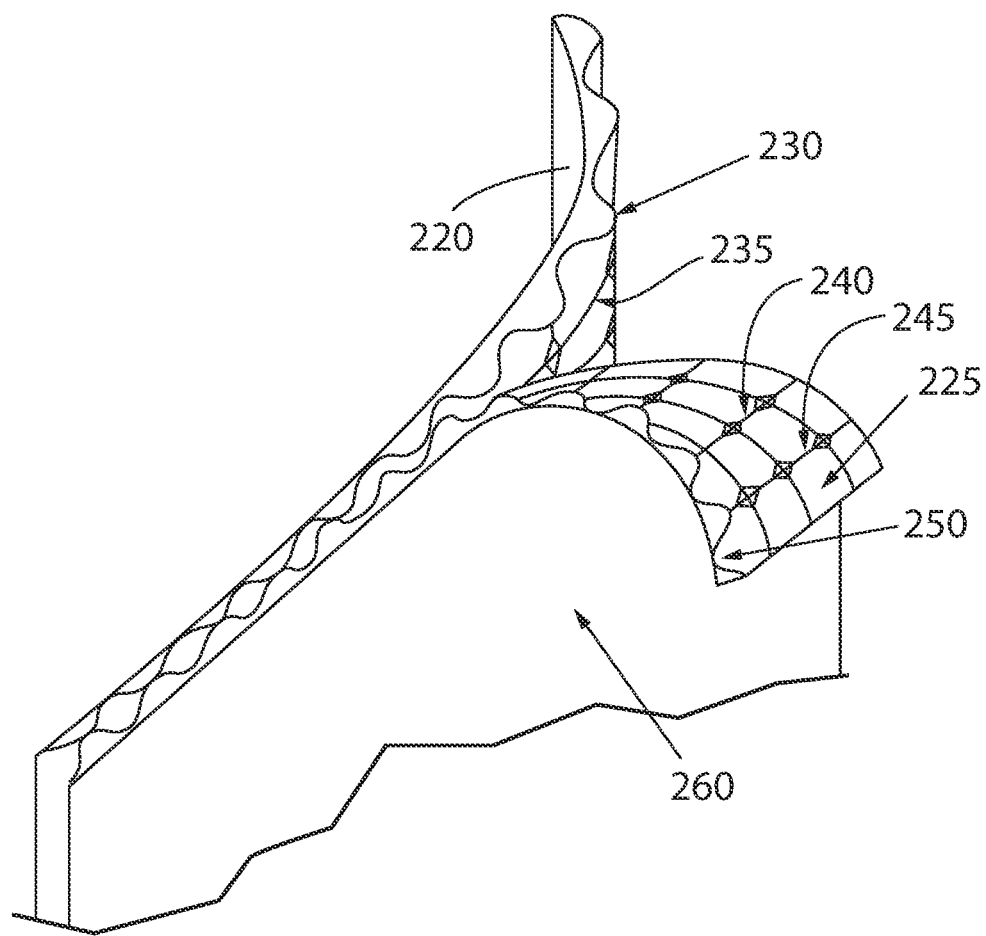
FIG. 11 shows a 4 ply matrix corrugated board semi corrugated board doublewall panel.

A 4 ply doublewall panel made from C flute matrix corrugated board and B flute semi corrugated board is shown in FIG. 11. To create this product, a C flute matrix corrugated board singleface web 220 and a B flute semi corrugated board creased base layer 225 are run through independent levels of a glue machine, then bonded together in a doubefacer in a configuration with the inside flutes 230 and the cross flute bond lines 235 of the matrix corrugated board C flute singleface web 220 bonded directly to the inside flutes 240 of the B flute semi corrugated board creased base layer 225, and then the outside flutes 250 and the cross flute bond lines 245 of the B flute semi corrugated board creased base layer 225 bonded to the bottom liner 260 to form a four ply doublewall panel.

Figure 12:
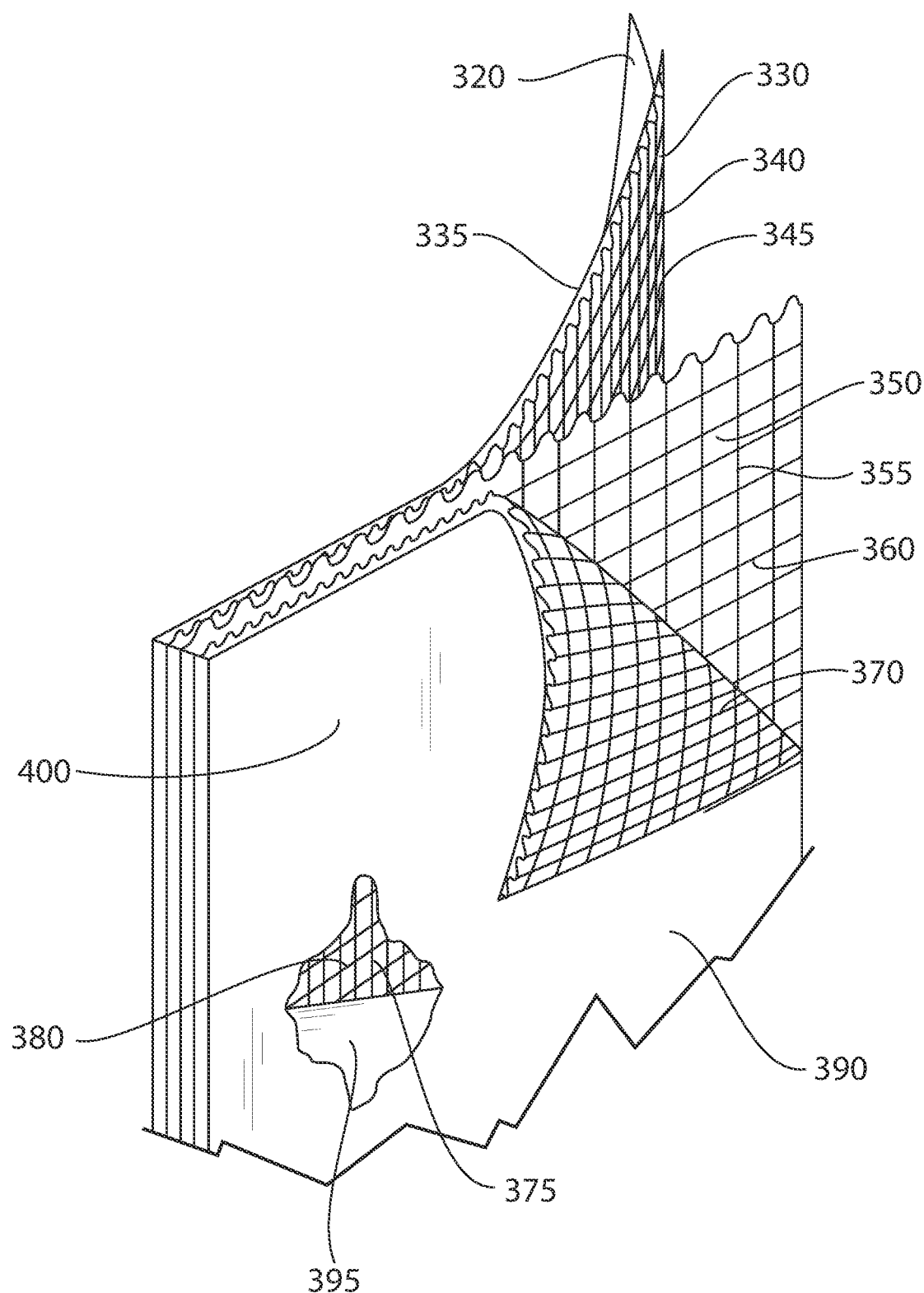
FIG. 12 shows a 5 ply triplewall semi corrugated board panel.

A 5 ply triplewall panel made from E and C flute creased base layers and top and bottom liners is shown in FIG. 12 with components referenced not to scale. To create this triplewall panel three creased base layers are run through independent levels of a triple stack glue machine and subsequently bonded together along with top and bottom liners. An E flute creased base layer 330 is bonded to a top liner 320 on a most upstream singlefacer to create a single-face web 335 that has downward facing flutes 340 and downward facing cross flute bond lines 345. This singleface web 335 is then bonded to the back side of a C flute creased base layer 350 that has been created on a more downstream singlefacer on the corrugator. Starch adhesive is applied to the flute tips 355 and cross flute bond lines 360 of this C flute creased base layer 350 that is then bonded to the backside of another E flute creased base layer 370 that has been created on the most downstream singlefacer on the corrugator. E flute creased base layer 370 is then bonded to the bottom liner 390 after starch adhesive is applied to flute tips 375 and cross flute bond lines 380 shown where flap 395 of bottom liner 390 is shown peeled away from E flute creased base layer 390 for purposes of showing the flutes 375 and cross flute bond lines 380. This results in formation of a 5 ply triplewall panel 400.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A paperboard product of comprising;
   a top liner;
   a fluted medium of a first flute type having opposed tips directed in a downward direction and upward direction, respectively, bonded to the top liner to define a single-face web with exposed flute tips directed in the downward direction;
   a bottom liner;
   a creased base layer of a second flute type having opposed tips directed in a downward direction and upward direction, respectively, with multiple cross flute bond lines creased in-line at intervals across a second web and directed in the downward direction; and
   a creased base layer of a third flute type having opposed tips directed in the downward direction and upward direction, respectively, with multiple cross flute bond lines creased in-line at intervals across a third web and directed in the downward direction;
   wherein the singleface web is bonded directly to the creased base layer of the second flute type, and the creased base layer of the second flute type is bonded directly to the creased base layer of the third flute type, and the creased base layer of the third flute type is bonded directly to the bottom liner to define a five ply triplewall panel.

2. A paperboard product comprising;
   a top liner;
   a creased base layer of a first flute type having opposed tips directed in a downward direction and upward direction, respectively, bonded to the top liner to define a singleface web with cross flute bond lines directed in the downward direction;
   a bottom liner;
   a second creased base layer of a second flute type having opposed tips directed in a downward direction and upward direction, respectively, with multiple cross flute bond lines creased in-line at intervals across a second web with cross flute bond lines directed in the downward direction; and
   a third creased base layer of a third flute type having opposed tips directed in a downward direction and upward direction, respectively, with multiple cross flute bond liners creased in-line at intervals across a third web with cross flute bond lines directed in the downward direction;
   wherein the singleface web comprised of the top liner and the creased base layer of the first flute type is bonded directly to the second creased base layer of the second flute type, the second creased base layer of the second flute type is bonded directly to a third creased base layer, and the third creased base layer is bonded to the bottom liner to form a five ply triplewall panel.

\* \* \* \* \*